United States Patent
Fukudome et al.

(10) Patent No.: US 12,240,972 B2
(45) Date of Patent: *Mar. 4, 2025

(54) METHOD FOR PRODUCING VINYL CHLORIDE TYPE POLYMER

(71) Applicant: Shin-Etsu Chemical Co., Ltd., Tokyo (JP)

(72) Inventors: Hiroshi Fukudome, Kamisu (JP); Kazuhiro Kumakura, Kamisu (JP); Toshihiko Kawakubo, Kamisu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 619 days.

This patent is subject to a terminal disclaimer.

(21) Appl. No.: 17/619,305

(22) PCT Filed: Jun. 8, 2020

(86) PCT No.: PCT/JP2020/022522
§ 371 (c)(1),
(2) Date: Dec. 15, 2021

(87) PCT Pub. No.: WO2020/255776
PCT Pub. Date: Dec. 24, 2020

(65) Prior Publication Data
US 2022/0403150 A1 Dec. 22, 2022

(30) Foreign Application Priority Data

Jun. 19, 2019 (JP) .................. 2019-113439

(51) Int. Cl.
*C08F 2/30* (2006.01)
*C08L 27/06* (2006.01)
*C08F 14/06* (2006.01)

(52) U.S. Cl.
CPC .................. *C08L 27/06* (2013.01)

(58) Field of Classification Search
None
See application file for complete search history.

(56) References Cited

U.S. PATENT DOCUMENTS

| | | | | |
|---|---|---|---|---|
| 6,965,002 B2 * | 11/2005 | Usuki | ...................... | C08F 14/06 526/63 |
| 6,977,288 B2 * | 12/2005 | Nakahara | ................ | C08F 14/06 526/344.1 |
| 2004/0186257 A1 | 9/2004 | Usuki et al. | | |
| 2022/0235159 A1 * | 7/2022 | Fukudome | ............. | C08L 27/06 |

FOREIGN PATENT DOCUMENTS

| | | |
|---|---|---|
| EP | 1 445 265 A1 | 8/2004 |
| JP | 53-114891 | 10/1978 |
| JP | 2-292310 A | 12/1990 |
| JP | 5-32707 A | 2/1993 |
| JP | 11-322838 A | 11/1999 |
| JP | 2004-238522 A | 8/2004 |
| JP | 3996069 B2 | 10/2007 |
| JP | 2008-285520 A | 11/2008 |
| JP | 2009-62425 A | 3/2009 |
| JP | 2019-25447 A | 2/2019 |

OTHER PUBLICATIONS

Machine translation of JP-11322838-A (no date).*
International Search Report mailed on Jul. 28, 2020 in PCT/JP2020/022522 filed on Jun. 8, 2020, 2 pages.
Combined Russian Office Action and Search Report issued Aug. 29, 2023, in corresponding Russian Patent Application No. 2021137393 (with English Translation), 20 pages.
Moskvichev Yu. A. et al., "Theoretical foundations of chemical technology", Textbook. 2nd ed., rev.—St. Petersburg: Publishing house "Lan", 2016, 7 pages (with English Translation).
Extended European Search Report issued on May 30, 2023 in the European Application No. 20825871.5 therein, 6 pages.
Combined Chinese Office Action and Search Report issued Dec. 9, 2022 in Patent Application No. 202080044218.0 (with English machine translation), 14 pages.
Japanese Office Action issued on Mar. 22, 2023 in Japanese Patent Application No. 2019-113439 (with English translation), 9 pages.

* cited by examiner

*Primary Examiner* — Michael J Feely
(74) *Attorney, Agent, or Firm* — Oblon, McClelland, Maier & Neustadt, L.L.P.

(57) ABSTRACT

A method for producing a vinyl chloride type polymer is to produce the vinyl chloride type polymer by polymerizing a vinyl chloride monomer, or a mixture of a vinyl chloride monomer with a monomer copolymerizable with the vinyl chloride monomer in an aqueous medium by using a polymerization reactor. An aqueous solution of a copolymerized polyether having a weight-average molecular weight of 1,000 to 3,500 with a mole ratio of ethylene oxide to propylene oxide in the range of 10/90 to 60/40 is charged into the polymerization reactor with an amount of 0.005 to 0.050 part by weight as the copolymerized polyether relative to 100 parts by weight of the vinyl chloride monomer.

6 Claims, No Drawings

METHOD FOR PRODUCING VINYL CHLORIDE TYPE POLYMER

FIELD

The present invention relates to the method for producing a vinyl chloride type polymer in a polymerization reactor equipped with a reflux condenser.

BACKGROUND

In the production method of a vinyl chloride type polymer, in order to improve the productivity thereof, it has been attempted in recent years to increase the size of the polymerization reactor and to reduce the polymerization time. As the means to reduce the polymerization time, the method is employed in which the polymerization reactor is equipped with a reflux condenser so as to enhance the removal efficiency of the heat of the polymerization reaction thereby achieving reduction of the reaction time.

However, in a case that production of the vinyl chloride type polymer is conducted by a suspension polymerization method in an aqueous medium, and a water-soluble surface-active substance (for example, partially saponified polyvinyl alcohol or cellulose ether) is used as the dispersing agent, when heat removal is conducted using a reflux condenser, the amount of heat removal increases. Accordingly, it is difficult to obtain the polymer having an intended constant quality in the particle size distribution, the porosity, the bulk density, and the like of the vinyl chloride type polymer.

In addition, when the foaming becomes vigorous, the polymerization reaction solution is blown up into the condenser to cause the polymer particles to deposit inside the condenser, and subsequently these particles return into the reaction solution to be mixed therein or the like. Accordingly, in addition to the before-mentioned problem, there has been the problem of deterioration of the polymer quality such as the increase in the fish eyes and the foreign matters in the formed film.

In order to suppress the foaming due to heat removal by the reflux condenser, the method in which an ethylene oxide/propylene oxide copolymerized polyether having the weight-average molecular weight of 1,500,000 to 2,000,000 is added as the antifoaming agent is proposed (see, Patent Literature 1).

However, in a large polymerization reactor that has been developed in recent years, with the above-mentioned method, the weight-average molecular weight of the antifoaming agent is so large that dispersion thereof in the polymerization reactor is difficult, so that a sufficient defoaming effect cannot be obtained.

CITATION LIST

Patent Literature

Patent Literature 1: Japanese Patent No. 3996069

SUMMARY

Technical Problem

The present invention has an object to provide the method for enabling production of a vinyl chloride type polymer, in which in production of the vinyl chloride type polymer, foaming of a polymer slurry formed at the time of conducting polymerization by using a polymerization reactor can be suppressed, and in addition, there is no adverse effect to the quality such as a bulk density of the vinyl chloride type polymer thus obtained.

Solution to Problem

To solve the above problem, the present invention provides a method for producing a vinyl chloride type polymer, the method being to produce the vinyl chloride type polymer by polymerizing a vinyl chloride monomer, or a mixture of a vinyl chloride monomer with a monomer copolymerizable with the vinyl chloride monomer in an aqueous medium by using a polymerization reactor, the method including: charging an aqueous solution of a copolymerized polyether having a weight-average molecular weight of 1,000 to 3,500 with a mole ratio of ethylene oxide to propylene oxide in a range of 10/90 to 60/40 into the polymerization reactor with an amount of 0.005 to 0.050 parts by weight as the copolymerized polyether relative to 100 parts by weight of the vinyl chloride monomer.

It is preferable that in the polymerization, the aqueous solution of the copolymerized polyether is added at a polymerization stage with a polymerization rate of 30 to or.

It is preferable that a volume of the polymerization reactor is 50 m$^3$ or more.

It is preferable that the polymerization reactor is equipped with a reflux condenser.

Advantageous Effects of Invention

According to the method of the present invention, when a vinyl chloride monomer, or a mixture of a vinyl chloride monomer with a monomer that is copolymerizable with the vinyl chloride monomer is polymerized in an aqueous medium to produce a vinyl chloride type polymer, the vinyl chloride type polymer having a stable quality can be produced without substantially causing foaming in the polymerization reaction solution.

DESCRIPTION OF EMBODIMENTS

Hereinafter, the present invention will be described in detail.

Monomer

The monomer raw material to be used in the present invention is a vinyl chloride monomer, or a monomer mixture mainly composed of the vinyl chloride monomer. The monomer mixture mainly composed of the vinyl chloride monomer is a mixture of at least 50% or more by weight, or preferably 80% or more by weight of the vinyl chloride monomer with other monomer that is copolymerizable with the vinyl chloride monomer. Illustrative examples of the other monomer that is copolymerizable with the vinyl chloride monomer and can be used here include: vinyl esters such as vinyl acetate and vinyl propionate; (meth)acrylate esters such as methyl (meth)acrylate and ethyl (meth)acrylate; olefins such as ethylene and propylene; maleic anhydride; acrylonitrile; styrene; and vinylidene chloride. These monomers may be used singly, or as a combination of two or more of them.

Aqueous Solution of Copolymerized Polyether

The present invention uses an aqueous solution of a copolymerized polyether. The present invention also uses the copolymerized polyether having the weight-average molecular weight of 1,000 to 3,500, and preferably more than 1,100 and 3,200 or less, and having the mole ratio of ethylene oxide and propylene oxide (mole ratio of ethylene oxide to propylene oxide) in the range of 10/90 to 60/40, and preferably in the range of 20/80 to 60/40. Specifically, the copolymerized polyether is the copolymer that is obtained by polymerizing ethylene oxide and propylene oxide with the above-described mole ratio, so that this polyether has the composition unit derived from ethylene oxide and the composition unit derived from propylene oxide. Here, the weight-average molecular weight is measured by GPC and is the value in terms of polystyrene.

When the molecular weight of the copolymerized polyether is less than 1,000, the effect of lowering the interfacial tension of the foams formed in the polymerization system to break the foams during polymerization is decreased, so that the defoaming effect thereof is insufficient. Therefore, it becomes necessary to increase the use amount thereof; then, this causes a problem of affecting the quality of the polymer to be obtained. On the other hand, when the molecular weight of the copolymerized polyether is more than 3,500, dispersion thereof becomes difficult, especially in a large-scale polymerization reactor, thereby causing deterioration of the antifoaming effect, resulting in deterioration of the quality of the produced vinyl chloride polymer.

When the mole ratio of ethylene oxide to propylene oxide is outside of the above-mentioned range, there occurs a problem in that the antifoaming effect is decreased, or even this causes a problem of increase in the foaming.

Here, the copolymerized polyether formed of ethylene oxide and propylene oxide may be any of a block copolymer and a random copolymer.

The copolymerized polyether formed of ethylene oxide and propylene oxide is used preferably in the state of an aqueous solution, in which the solid concentration thereof is adjusted so as to be in the range of 0.1 to 50% by weight. In this aqueous solution, an organic solvent such as ethanol may be added if necessary. In other words, in the present invention, the copolymerized polyether in the solution containing an organic solvent may be used.

The use amount of the copolymerized polyether relative to the charge amount of the vinyl chloride monomer is in the range of 0.005 to 0.050 part by weight, and preferably in the range of 0.010 to 0.030 part by weight, this being added into the polymerization reaction system as the aqueous solution. When the used amount of the copolymerized polyether relative to the charge amount of the vinyl chloride monomer is less than 0.005 part by weight, the antifoaming effect cannot be sufficiently expressed. When the use amount is more than 0.050 part by weight, not only this is economically disadvantageous due to increase in the use amount but also this facilitates adhesion of the scale onto the wall surface of the polymerization reactor so that there is a risk to increase the fish eyes. As described before, the copolymerized polyether is added into the polymerization reaction system as the aqueous solution with the concentration of usually in the range of 0.1 to 50% by weight, and preferably in the range of 0.5 to 20% by weight.

It is preferable that the aqueous solution of the copolymerized polyether is added when the polymerization rate is in the range of 30 to 80%, and preferably in the range of 60 to 80%. When the addition time is before the polymerization rate of 30%, this is the period when the particle formation of the polymer is still insufficient, so that there is a risk that the addition thereof causes an adverse effect to the particle size distribution. On the other hand, when the polymerization rate is more than 80%, the foaming peak has already passed so that there is a risk that the polymerization reaction solution is blown up into a condenser to cause the polymer particles to deposit in the condenser; therefore, the advantageous effect of adding the antifoaming agent may be deteriorated.

Aqueous Medium

Illustrative examples of the aqueous medium include: water such as tap water, deionized water, distilled water, and ultrapure water; and a mixed medium of water with a water-soluble organic solvent. Illustrative examples of the water-soluble organic solvent include alcohols such as methanol, ethanol, n-propanol, isopropanol (2-propanol), ethyleneglycol, and diethyleneglycol. When the aqueous medium is the mixed medium, the content of the water-soluble organic solvent in the aqueous medium is preferably more than 0% by mass and 50% or less by mass.

Dispersing Agent

There is no particular restriction in the dispersing agent usually used in polymerization of the vinyl chloride or the monomer mixture containing the vinyl chloride as described above in the aqueous medium; the dispersing agent conventionally used in production of the vinyl chloride type polymer may be used without problems. Illustrative examples of the dispersing agent like this include: water-soluble cellulose ethers such as methyl cellulose, hydroxyethyl cellulose, hydroxypropyl cellulose, and hydroxypropyl methyl cellulose; water-soluble partially saponified polyvinyl alcohols; acrylate polymers; water-soluble polymers such as gelatin; oil-soluble emulsifying agents such as sorbitan monolaurate, sorbitan trioleate, glycerin tristearate, and ethylene oxide-propylene oxide block copolymers; and water-soluble emulsifying agents such as polyoxyethylene sorbitan monolaurate, polyoxyethylene glycerin oleate, and sodium laurate. These may be used singly, or as a combination of two or more of them. The use amount thereof relative to 100 parts by mass of the charged amount of the vinyl chloride monomer is preferably in the range of 0.010 to 0.200 part by weight, and more preferably in the range of 0.030 to 0.15 part by mass.

Polymerization Initiator

There is no particular restriction in the usually used polymerization initiator, and the polymerization initiator conventionally used in production of the vinyl chloride type polymer may be used without problems. Illustrative examples of the polymerization initiator include: peroxycarbonate compounds such as diisopropyl peroxydicarbonate, bis(2-ethylhexyl)peroxydicarbonate, and diethoxyethylperoxydicarbonate; peroxyester compounds such as tert-butylperoxypivalate, tert-hexylperoxypivalate, tert-butylperoxyneodecanate, and α-cumylperoxyneodecanate; peroxides such as acetylcyclohexylsulfonyl peroxide, 2,4,4-trimethylpentyl-2-peroxyphenoxy acetate, and 3,5,5-trimethylhexanoyl peroxide; azo compounds such as azobis(2,4-dimethylvaleronitrile) and azobis(4-methoxy-2,4-dimethylvaleronitrile); potassium persulfate; ammonium persulfate; and hydrogen peroxide. These may be used singly, or as a combination of two or more of them. The use amount thereof relative to 100 parts by mass of the charged amount of the vinyl chloride monomer is preferably in the range of 0.010 to 0.200 part by weight, and more preferably in the range of 0.03 to 0.15 part by mass.

Antioxidant

There is no particular restriction in the usually used antioxidant, and the antioxidant generally used in production of the vinyl chloride type polymer may be used without problems. Illustrative examples of the antioxidant include: phenol compounds such as 2,2-bis(4-hydroxyphenyl)propane, hydroquinone, p-methoxyphenol, tert-butyl-hydroxyanisole, n-octadecyl-3-(4-hydroxy-3,5-di-tert-butylphenyl)

propionate, tert-butylhydroquinone, 2,5-di-tert-butylhydroquinone, 4,4'-butylidene-bis(3-methyl-6-tert-butylphenol), 3,5-di-tert-butyl-4-hydroxytoluene, 2,2'-methylene-bis(4-ethyl-6-tert-butylphenol), triethyleneglycol-bis[3-(3-tert-butyl-5-methyl-4-hydroxyphenyl)propionate], pentaerythrityl-tetrakis[3-(3,5-di-tert-butyl-4-hydroxyphenyl)propionate], 2,6-di-tert-butyl-4-sec-butylphenol, 2,6-di-tert-butyl-4-methylphenol, 4-tert-butylcathecol, 4,4'-thiobis(6-tert-butyl-m-cresol), tocopherol, and nordihydroguaiaretic acid; semicarbazide derivatives such as semicarbazide, 1-acetylsemicarbazide, 1-chloroacetylsemicarbazide, 1-dichloroacetylsemicarbazide, 1-benzoylsemicarbazide, and semicarbazone; thiocarbazide derivatives such as carbohydrazide, thiosemicarbazide, and thiosemicarbazone; amine compounds such as N,N'-diphenyl-p-phenylenediamine and 4,4'-bis(2,4-dimethylbenzyl)diphenylamine; nitro compounds or nitroso compounds such as 4-nitroanisole, N-nitrosodiphenylamine, 4-nitroaniline, and N-nitrosophenylhydroxyleelamine aluminum salt; phosphorous compounds such as triphenyl phosphite, diphenylisodecyl phosphite, phenyldiisodceyl phosphite, 4,4'-butylidene-bis(3-methyl-6-tert-butylphenyl-di-tridecylphosphite), cyclic neopentanetetraylbis(octadecylphosphite), tris(nonylphenyl) phosphite, and tris(di-nonylphenyl) phosphite; unsaturated hydrocarbon compounds such as styrene, 1,3-hexadiene, and α-methylstyrene; and sulfur compounds such as dilauryl thiodipropionate, dimyristyl thiodipropionate, distearyl thiodipropionate, dodecylmercaptane, and 1,3-diphenyl-2-thiourea.

Among these, because the obtained polymer has the excellent initial anticoloring property (property to hardly cause coloring when the polymer is processed by molding), and also because there are fewer scales adhering to the polymerization reactor, preferable are 3,5-di-tert-butyl-4-hydroxytoluene, triethyleneglycol-bis[3-(3-tert-butyl-5-methyl-4-hydroxyphenyl)propionate], tert-butyl-hydroxyanisole, tert-butylhydroquinone, 2,6-di-tert-butyl-4-sec-butylphenol, and octadecyl-3-(3,5-di-tert-butyl-4-hydroxyphenyl)propionate. These may be used singly, or as a combination of two or more of them. The use amount of the antioxidant relative to 100 parts by mass of the charged amount of the vinyl chloride monomer is preferably in the range of 0.050 or less part by weight and 0 or more part by mass.

Other Arbitrary Ingredients

In the method of the present invention, a polymerization degree controlling agent, a chain transfer, a gelation modifying agent, an antistatic agent, and the like that are generally used in production of the vinyl chloride type polymer may be arbitrarily used as needed. Also, in order to control the polymerization reaction, to prevent deterioration of the produced polymer, and the like, the antioxidant may be added into the polymerization system before start of the polymerization, during the polymerization, or after completion of the polymerization.

Other Conditions

Other conditions in the polymerization may be the same as those conventionally used, namely, the conditions including: the charging methods of the aqueous medium, the vinyl chloride monomer or the monomer mixture including the vinyl chloride monomer, the dispersion assisting agent, the polymerization initiator, and the like into the polymerization reactor; the ratio of charging amounts of them; and the polymerization temperature.

There is no particular restriction in the shape, size, and the like in the polymerization reactor. In general, a durable polymerization reactor, for example, made of SUS, is preferably used. In view of productivity, polymerization may be carried out by using the polymerization reactor whose volume is preferably 50 m$^3$ or greater, and more preferably 80 m$^3$ or greater. In the case of the large polymerization reactor, it is especially preferable to equip a reflux condenser to the polymerization reactor.

The polymerization process is conducted, for example, by a suspension polymerization. In this case, after the vinyl chloride monomer (or the vinyl chloride monomer mixture) is charged into the polymerization reaction vessel (polymerization reactor) that is equipped with a jacket, the polymerization reaction is started by feeding hot water into the jacket. After the polymerization reaction is started, the temperature of the polymerization reaction is kept constant with feeding cold water into the jacket. In addition to the heat removal by the jacket, the feed of cold water to the reflux condenser is started to carry out the polymerization.

Although the polymerization condition is not particularly restricted, more specifically, for example, after the vinyl type monomers, other additives as described above, a suspending agent (water-soluble polymer such as cellulose or PVA), and the aqueous medium are charged into the polymerization reactor, the temperature of the contents in the polymerization reactor is raised with stirring to carry out the polymerization reaction. Specifically, the polymerization reaction is carried out in the temperature range of 20 to 80° C. and the time range of 1 to 20 hours. The stirring condition may be arbitrarily adjusted; the polymerization is carried out with controlling the rotation number in the range of 10 to 300 rpm, and preferably in the range of 50 to 200 rpm.

Addition of the aqueous solution of the copolymerized polyether is desirably carried out, as described before, when the polymerization rate of vinyl chloride (or the vinyl chloride monomer mixture) is in the range of 30 to 80%, and preferably in the range of 60 to 80%. Here, the polymerization rate is the ratio of the obtained vinyl chloride resin (vinyl chloride type polymer) to the total amount of the charged vinyl chloride monomer (or the vinyl chloride monomer mixture).

When the addition is made at the polymerization rate of less than 30%, there is a risk of unstable polymerization. On the other hand, when the addition is made at the polymerization rate of 80% or higher, the level of foaming has already passed the peak thereof or has reached near the peak thereof, so that the defoaming effect can be small.

The addition method thereof is arbitrary, and the addition may be done all at once or gradually.

In a large polymerization reactor that has been developed in recent years, by the method disclosed in Patent Literature 1, the weight-average molecular weight of the antifoaming agent is too large to diffuse it in the polymerization reactor; thus, a sufficient defoaming effect cannot be obtained. On the other hand, in the present invention, the specific amount of the copolymerized polyether having the specific weight-average molecular weight is added at the specific polymerization stage. By so doing, even in the case of a large polymerization reactor, and in addition, in the case of the reactor equipped with the reflux condenser, the copolymerized polyether can be diffused in the polymerization reactor sufficiently well so that the antifoaming effect can be obtained. In addition, this does not cause an adverse effect to the quality of the vinyl chloride type polymer thereby obtained.

EXAMPLES

Hereinafter, the present invention will be explained in more detail by Examples and the like, but the present invention is not limited to these. Unless otherwise specifically described, "%" described hereinafter means "% by weight", and the polymerization rate is based on the result obtained in the polymerization that is previously conducted to study the relationship between the polymerization time and the polymerization rate. The present invention was assessed by dispersibility, antifoaming characteristics, and adhesion amount of PVC to the wall surface.

Example 1

Into a polymerization reactor having an inner volume of 100 m$^3$, made of a stainless steel, and equipped with a reflux condenser and a foam sensor, were added 49.0 tons of deionized water, 19.1 kg of a partially saponified polyvinyl alcohol having the saponification degree of 80% by mole, and 7.15 kg of hydroxymethyl cellulose having the methoxy substitution degree of 28.5% by weight and the hydroxylpropyl substitution degree of 8.9% by weight; then, the prescribed amount 35.0 tons of vinyl chloride monomer was charged into it. Next, 17.5 kg of bis(2-ethylhexyl)peroxydicarbonate, i.e., the polymerization initiator, was charged to it, and at the same time, hot water was introduced into the jacket to start raising the temperature. When the temperature inside of the polymerization reactor reached 57.0° C., with keeping this temperature, the polymerization was continued by stirring with the rotation number of 250 rpm.

When the polymerization rate reached 70%, 350 kg of the aqueous solution containing 1% of the copolymerized polyether having the weight-average molecular weight of 3,200 with the mole ratio of ethylene oxide to propylene oxide being 60/40 was added; then, the reaction was continued until the pressure inside of the polymerization reactor dropped to 0.588 MPa·G (4,410 mmHg) (polymerization rate of 86%). Then, 35 kg of the aqueous dispersion solution containing 30% of triethyleneglycol-bis[3-(3-tert-butyl-5-methyl-4-hydroxyphenyl)propionate] was added into the polymerization reactor; then, the unreacted monomer was recovered. After pH of the polymer slurry thereby obtained was adjusted by adding 10 kg of the aqueous solution containing 25% of ammonia, the polymer slurry was dehydrated and dried to obtain the vinyl chloride polymer. There was no particular problem in the particle size distribution, the bulk density, and the porosity.

Example 2

The experiment was carried out by the same way as Example 1 except for the condition of the polyether. Specifically, the aqueous solution containing 1% of the copolymerized polyether having the weight-average molecular weight of 1,800 with the mole ratio of ethylene oxide to propylene oxide being 40/60 was used.

Example 3

The experiment was carried out by the same way as Example 1 except for the condition of the polyether. Specifically, the aqueous solution containing 1% of the copolymerized polyether having the weight-average molecular weight of 2,300 with the mole ratio of ethylene oxide to propylene oxide being 30/70 was used.

Example 4

The experiment was carried out by the same way as Example 1 except for the condition of the polyether. Specifically, the aqueous solution containing 1% of the copolymerized polyether having the weight-average molecular weight of 3,100 with the mole ratio of ethylene oxide to propylene oxide being 20/80 was used.

Example 5

The experiment was carried out by the same way as Example 1 except for the condition of the polyether. Specifically, the aqueous solution containing 1% of the copolymerized polyether having the weight-average molecular weight of 1,100 with the mole ratio of ethylene oxide to propylene oxide being 10/90 was used.

Example 6

The experiment was carried out by the same way as Example 1 except for the condition of the polyether. Specifically, the aqueous solution containing 1% of the copolymerized polyether having the weight-average molecular weight of 2,800 with the mole ratio of ethylene oxide to propylene oxide being 20/80 was used.

Example 7

The experiment was carried out by the same way as Example 1 except for the condition of the polyether. Specifically, the aqueous solution containing 1% of the copolymerized polyether having the weight-average molecular weight of 2,500 with the mole ratio of ethylene oxide to propylene oxide being 20/80 was used.

Example 8

The experiment was carried out by the same way as Example 4 except that 175 kg of the aqueous solution containing 1% of the copolymerized polyether was added.

Example 9

The experiment was carried out by the same way as Example 4 except that 1,050 kg of the aqueous solution containing 1% of the copolymerized polyether was added.

Example 10

The experiment was carried out by the same way as Example 4 except that the aqueous solution containing 1% of the copolymerized polyether was added when the polymerization rate reached 40%.

Example 11

The experiment was carried out by the same way as Example 4 except that the aqueous solution containing 1% of the copolymerized polyether was added when the polymerization rate reached 80%.

Example 12

The experiment was carried out by the same way as Example 2 except that 175 kg of the aqueous solution containing 1% of the copolymerized polyether was added.

Example 13

The experiment was carried out by the same way as Example 2 except that the aqueous solution containing 1% of the copolymerized polyether was added when the polymerization rate reached 40%.

Example 14

The experiment was carried out by the same way as Example 2 except that the aqueous solution containing 1% of the copolymerized polyether was added when the polymerization rate reached 80%.

Comparative Example 1

The experiment was carried out by the same way as Example 1 except that the polymerization reactor having an inner volume of 100 m$^3$, made of a stainless steel, and equipped with a foam sensor but not equipped with a reflux condenser, was used, and that the copolymerized polyether was not used.

Comparative Example 2

The experiment was carried out by the same way as Example 1 except that the copolymerized polyether was not used.

Comparative Example 3

The experiment was carried out by the same way as Example 1 except that the following copolymerized polyether was used. Specifically, the aqueous solution containing 1% of the copolymerized polyether having the weight-average molecular weight of 1,500,000 with the mole ratio of ethylene oxide to propylene oxide being 80/20 was used.

Comparative Example 4

The experiment was carried out by the same way as Example 1 except that the following copolymerized polyether was used. Specifically, the aqueous solution containing 1% of the copolymerized polyether having the weight-average molecular weight of 15,000 with the mole ratio of ethylene oxide to propylene oxide being 20/80 was used.

Composition and Assessment Results

TABLE 1

| | | Example 1 | Example 2 | Example 3 | Example 4 | Example 5 | Example 6 | Example 7 |
|---|---|---|---|---|---|---|---|---|
| Antifoaming agent | Ethylene oxide/propylene oxide copolymer | ○ | ○ | ○ | ○ | ○ | ○ | ○ |
| | Weight-average molecular weight | 3,200 | 1,800 | 2,300 | 3,100 | 1,100 | 2,800 | 2,500 |
| | Mole ratio of ethylene oxide and propylene oxide (mol %/mol %) | 60/40 | 40/60 | 30/70 | 20/80 | 10/90 | 20/80 | 20/80 |
| | Viscosity of the 1% aqueous solution (cP) | 1.30 | 1.29 | 1.30 | 1.30 | 1.28 | 1.30 | 1.30 |
| | Addition amount of the 1% aqueous solution (kg) | 350 | 350 | 350 | 350 | 350 | 350 | 350 |
| | Addition amount as pure substance relative to vinyl chloride monomer (ppm) | 100 | 100 | 100 | 100 | 100 | 100 | 100 |
| | Addition time (polymerization rate) | 70% | 70% | 70% | 70% | 70% | 70% | 70% |
| Dispersibility | | ○ | ○ | ○ | ○ | ○ | ○ | ○ |
| Existence of reflux condenser | | ○ | ○ | ○ | ○ | ○ | ○ | ○ |
| Adhesion of PVC to wall surface | | ○ | ○ | ○ | ○ | ○ | ○ | ○ |
| Antifoaming effect in the 100 m$^3$ polymerization reactor | | ◎ | ◎ | ◎ | ◎ | ○ | ◎ | ◎ |
| Absorption amount of plasticizer (%) | | 22.9 | 23.0 | 23.0 | 23.1 | 22.9 | 23.0 | 23.1 |
| Bulk density (g/mL) | | 0.533 | 0.531 | 0.532 | 0.532 | 0.532 | 0.531 | 0.532 |

| | | Example 8 | Example 9 | Example 10 | Example 11 | Example 12 | Example 13 | Example 14 |
|---|---|---|---|---|---|---|---|---|
| Antifoaming agent | Ethylene oxide/propylene oxide copolymer | ○ | ○ | ○ | ○ | ○ | ○ | ○ |
| | Weight-average molecular weight | 3,100 | 3,100 | 3,100 | 3,100 | 1,800 | 1,800 | 1,800 |
| | Mole ratio of ethylene oxide and propylene oxide (mol %/mol %) | 20/80 | 20/80 | 20/80 | 20/80 | 40/60 | 40/60 | 40/60 |
| | Viscosity of the 1% aqueous solution (cP) | 1.30 | 1.30 | 1.30 | 1.30 | 1.29 | 1.29 | 1.29 |
| | Addition amount of the 1% aqueous solution (kg) | 175 | 1050 | 350 | 350 | 175 | 350 | 350 |
| | Addition amount as pure substance relative to vinyl chloride monomer (ppm) | 50 | 300 | 100 | 100 | 50 | 100 | 100 |
| | Addition time (polymerization rate) | 70% | 70% | 40% | 80% | 70% | 40% | 80% |
| Dispersibility | | ○ | ○ | ○ | ○ | ○ | ○ | ○ |
| Existence of reflux condenser | | ○ | ○ | ○ | ○ | ○ | ○ | ○ |
| Adhesion of PVC to wall surface | | ○ | ○ | ○ | ○ | ○ | ○ | ○ |
| Antifoaming effect in the 100 m$^3$ polymerization reactor | | ○ | ◎ | ○ | ○ | ○ | ○ | ○ |
| Absorption amount of plasticizer (%) | | 22.9 | 23.0 | 22.9 | 23.0 | 23.0 | 23.1 | 23.0 |
| Bulk density (g/mL) | | 0.533 | 0.531 | 0.531 | 0.532 | 0.532 | 0.531 | 0.533 |

| | | Comparative Example 1 | Comparative Example 2 | Comparative Example 3 | Comparative Example 4 |
|---|---|---|---|---|---|
| Antifoaming agent | Ethylene oxide/propylene oxide copolymer | — | — | ○ | ○ |
| | Weight-average molecular weight | — | — | 1,500,000 | 15,000 |
| | Mole ratio of ethylene oxide and propylene oxide (mol %/mol %) | — | — | 80/20 | 20/80 |
| | Viscosity of the 1% aqueous solution (cP) | — | — | 21.5 | 1.65 |
| | Addition amount of the 1% aqueous solution (kg) | — | — | 350 | 350 |
| | Addition amount as pure substance relative to vinyl chloride monomer (ppm) | — | — | 100 | 100 |
| | Addition time (polymerization rate) | — | — | 70% | 70% |

TABLE 1-continued

| | | | | |
|---|---|---|---|---|
| Dispersibility | — | — | X | Δ |
| Existence of reflux condenser | X | ○ | ○ | ○ |
| Adhesion of PVC to wall surface | ○ | X | Δ | Δ |
| Antifoaming effect in the 100 m³ polymerization reactor | — | X | Δ | Δ |
| Absorption amount of plasticizer (%) | 23.0 | 24.0 | 22.5 | 23.1 |
| Bulk density (g/mL) | 0.531 | 0.518 | 0.533 | 0.530 |

Assessment of Dispersibility

An aqueous solution containing 1% of a copolymerized polyether was prepared; then, the viscosity of this aqueous solution was measured by using a digital rotation viscometer DV3T (manufactured by Eko Instruments Co., Ltd.). The viscosity measurement was conducted at 20° C. with the rotation number of 250 rpm in Examples 1 to 10, and 100 rpm in Comparative Example 2. When the viscosity of the aqueous solution containing 1% of the copolymerized polyether was 10 cP or higher, this was assessed as X; when 1.5 cP or higher and less than 10 cP, this was assessed as Δ; and when less than 1.5 cP, this was assessed as o.

Assessment of PVC Adhesion to Wall Surface Adhesion amount of the vinyl chloride resin to the wall surface of the polymerization reactor was assessed. When 100 particles or more of adhesion amount of the vinyl chloride resin per 1 cm² was visually observed, this was assessed as X; when 10 or more to less than 100 particles were observed, this was assessed as Δ; when less than 10 particles were observed, this was assessed as o.

Assessment of Antifoaming Effect in 100 m³ Polymerization Reactor

When lowering of the level as compared without addition (Comparative Example 2) was less than 10 cm, this was assessed as X; when 10 cm or more and less than 30 cm, this was assessed as Δ; when 30 cm or more to less than 50 cm, this was assessed as o; and when 50 cm or more, this was assessed as ⊚.

Absorption Amount of Plasticizer

Glass fibers were laid in the bottom of a polymerization reactor, made of an aluminum alloy, with the inner diameter of 25 mm and the depth of 85 mm; then, into this polymerization reactor were added 10 g of the sample PVC followed by further addition of 15 mL of dioctyl phthalate (DOP). After this was allowed to stand for 30 minutes to adequately penetrate DOP into the sample, an excess amount of DOP was centrifugally separated from the sample with the acceleration speed of 1,500 G. The absorbed amount of DOP relative to the sample weight before absorption of DOP was obtained as % by weight.

Bulk Density

The bulk density of the sample PVC was measured by the method in accordance with JIS K-6723.

The invention claimed is:

1. A method for producing a vinyl chloride type polymer, the method being to produce the vinyl chloride type polymer by polymerizing a vinyl chloride monomer, or a mixture of a vinyl chloride monomer with a monomer copolymerizable with the vinyl chloride monomer in an aqueous medium by using a polymerization reactor, the method comprising:
   charging an aqueous solution of a copolymerized polyether having a weight-average molecular weight of 1,000 to 3,500 with a mole ratio of ethylene oxide to propylene oxide in a range of 10/90 to 60/40 into the polymerization reactor with an amount of 0.005 to 0.050 parts by weight as the copolymerized polyether relative to 100 parts by weight of the vinyl chloride monomer,
   wherein in the polymerization, the aqueous solution of the copolymerized polyether is added at a polymerization stage with a polymerization rate of 30 to 80%.

2. The method for producing the vinyl chloride type polymer according to claim 1, wherein a volume of the polymerization reactor is 50 m³ or more.

3. The method for producing the vinyl chloride type polymer according to claim 1, wherein the polymerization reactor is equipped with a reflux condenser.

4. The method for producing the vinyl chloride type polymer according to claim 3, wherein a volume of the polymerization reactor is 50 m³ or more.

5. A method for producing a vinyl chloride type polymer, the method being to produce the vinyl chloride type polymer by polymerizing a vinyl chloride monomer, or a mixture of a vinyl chloride monomer with a monomer copolymerizable with the vinyl chloride monomer in an aqueous medium by using a polymerization reactor, the method comprising:
   charging an aqueous solution of a copolymerized polyether having a weight-average molecular weight of 1,000 to 3,500 with a mole ratio of ethylene oxide to propylene oxide in a range of 10/90 to 60/40 into the polymerization reactor with an amount of 0.005 to 0.050 parts by weight as the copolymerized polyether relative to 100 parts by weight of the vinyl chloride monomer,
   wherein the polymerization reactor is equipped with a reflux condenser.

6. The method for producing the vinyl chloride type polymer according to claim 5, wherein a volume of the polymerization reactor is 50 m³ or more.

\* \* \* \* \*